United States Patent
Tachibana et al.

(10) Patent No.: US 11,884,756 B2
(45) Date of Patent: Jan. 30, 2024

(54) PRODUCTION METHOD FOR MODIFIED VINYL ALCOHOL POLYMER PARTICLE AND PARTICLE OBTAINED THEREBY

(71) Applicant: KURARAY CO., LTD., Kurashiki (JP)

(72) Inventors: Yuki Tachibana, Kurashiki (JP); Yusuke Amano, Kurashiki (JP); Yuki Shimizu, Kurashiki (JP); Kazuhiko Maekawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 279 days.

(21) Appl. No.: 17/418,468

(22) PCT Filed: Dec. 26, 2019

(86) PCT No.: PCT/JP2019/051112
§ 371 (c)(1),
(2) Date: Jun. 25, 2021

(87) PCT Pub. No.: WO2020/138284
PCT Pub. Date: Jul. 2, 2020

(65) Prior Publication Data
US 2022/0089793 A1    Mar. 24, 2022

(30) Foreign Application Priority Data
Dec. 28, 2018   (JP) ................. 2018-248264

(51) Int. Cl.
*C08F 16/06*   (2006.01)
*C08J 7/16*   (2006.01)

(52) U.S. Cl.
CPC ............... *C08F 16/06* (2013.01); *C08J 7/16* (2013.01); *C08F 2810/00* (2013.01); *C08J 2329/04* (2013.01)

(58) Field of Classification Search
CPC ............ C08F 16/06; C08F 216/06; C08J 7/16
See application file for complete search history.

(56) References Cited

U.S. PATENT DOCUMENTS

| | | | |
|---|---|---|---|
| 2004/0096683 A1 | 5/2004 | Ikeda et al. | |
| 2009/0324836 A1 | 12/2009 | Tsurugi et al. | |
| 2019/0345279 A1 | 11/2019 | Amano et al. | |
| 2020/0087860 A1* | 3/2020 | Morikawa | C08F 16/06 |
| 2020/0362078 A1 | 11/2020 | Amano et al. | |

FOREIGN PATENT DOCUMENTS

| | | | |
|---|---|---|---|
| EP | 3 757 138 A1 | 12/2020 | |
| JP | 50-98509 | 8/1975 | |
| JP | 2003-231715 A | 8/2003 | |
| JP | 2007-63383 A | 3/2007 | |
| JP | 2007-321099 A | 12/2007 | |
| JP | 2009-108305 A | 5/2009 | |
| WO | WO 2018/124014 A1 | 7/2018 | |
| WO | WO 2018/124015 A1 | 7/2018 | |
| WO | WO 2018181735 | * 10/2018 | |
| WO | WO 2019/160142 A1 | 8/2019 | |

OTHER PUBLICATIONS

Extended European Search Report dated Nov. 9, 2022 in European Patent Application No. 19905341.4, 10 pages.
International Search Report dated Feb. 25, 2020 in PCT/JP2019/051112 filed on Dec. 26, 2019, 2 pages.
Mühlebach, A. et al., "New Water-Soluble Photo Crosslinkable Polymers Based on Modified Poly(vinyl alcohol)," Journal of Polymer Science: Part A: Polymer Chemistry, vol. 35, 1997, pp. 3603-3611.

\* cited by examiner

*Primary Examiner* — Jeffrey C Mullis
(74) *Attorney, Agent, or Firm* — Oblon, McClelland, Maier & Neustadt, L.L.P.

(57) ABSTRACT

A method of producing modified vinyl alcohol-based polymer particles, includes mixing vinyl alcohol-based polymer particles with a mixed medium containing unsaturated carboxylic acid, an acid catalyst, and water, wherein, by mixing the vinyl alcohol-based polymer particles with the mixed medium, the vinyl alcohol-based polymer particles are reacted with the unsaturated carboxylic acid to obtain modified vinyl alcohol-based polymer particles containing a vinyl ester unit represented by a formula (2) below, having a vinyl alcohol unit content based on the total constitutional units of 60 mol % or more and less than 95 mol %, and having an average particle diameter from 50 to 2000 µm. The production method is capable of controlling the particle shape and does not cause the problem of the residual sulfur content, and is further convenient and economically advantageous.

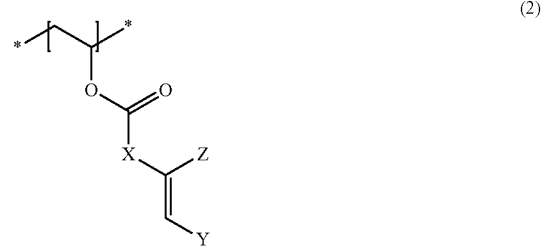

(2)

20 Claims, No Drawings

PRODUCTION METHOD FOR MODIFIED VINYL ALCOHOL POLYMER PARTICLE AND PARTICLE OBTAINED THEREBY

TECHNICAL FIELD

The present invention relates to a method of producing modified vinyl alcohol-based polymer particles having an unsaturated hydrocarbon group in a side chain and to particles obtained by the same.

BACKGROUND ART

Vinyl alcohol-based polymers represented by polyvinyl alcohol have excellent interfacial properties and strength properties as those of a limited number of crystalline water-soluble polymers, and thus are used for paper processing, fiber processing, emulsion stabilizers, and the like. Vinyl alcohol-based polymer gels obtained by crosslinking such a vinyl alcohol-based polymer by various methods are used for, due to their hydrophilicity and safety, super absorbent polymers, contact lenses, aqueous/organic solvent-based SEC column fillers, and the like. In particular, vinyl alcohol-based polymers having a vinyl alcohol unit content approximately from 60 to 95 mol % exhibit high performance as emulsion stabilizers and also exhibit high lipophilicity as column fillers. To improve specific functions, attempts are made to introduce a functional group and the like into the vinyl alcohol-based polymer and various modified vinyl alcohol-based copolymers are developed.

Among all, modified vinyl alcohol-based polymers having an unsaturated hydrocarbon group introduced into a side chain may be subjected to impartation of water resistance by crosslinking by high-energy beam radiation, modification by graft polymerization, and the like. As a method of introducing an unsaturated hydrocarbon group into a side chain, a generally used method causes the hydroxyl group in the vinyl alcohol-based polymer to be reacted with various compounds. For example, Patent Document 1 discloses a method of synthesizing a vinyl alcohol-based polymer containing an unsaturated hydrocarbon group by acetalization using aldehyde having an unsaturated hydrocarbon group. Patent Document 2 discloses a method of synthesizing a vinyl alcohol-based polymer containing an unsaturated hydrocarbon group by etherification using an epoxy compound having an unsaturated hydrocarbon group. However, some among compounds such as aldehyde and epoxy are considered to have mutagenicity and there is a demand for a method not using these compounds.

Meanwhile, there are disclosed methods of synthesizing a vinyl alcohol-based polymer containing an unsaturated hydrocarbon group by esterification using the safer unsaturated carboxylic acid or unsaturated carboxylic ester. For example, Patent Documents 3 and 4 disclose methods of obtaining a modified vinyl alcohol-based polymer comprising: dissolving a vinyl alcohol-based polymer in dimethyl sulfoxide (DMSO); followed by transesterification with unsaturated carboxylic ester; and then precipitation in a poor solvent. Patent Document 5 describes a method comprising: dissolving a vinyl alcohol-based polymer in water; and then esterifying with unsaturated carboxylic acid and an acid catalyst to produce a solution containing a modified vinyl alcohol-based polymer. Non-Patent Document 1 discloses a method of obtaining a modified vinyl alcohol-based polymer comprising: dissolving a vinyl alcohol-based polymer in water; followed by esterification with unsaturated carboxylic acid, acetic acid, and an acid catalyst; and then precipitation in a poor solvent.

PRIOR ART DOCUMENT

Patent Document

Patent Document 1: JP 2009-108305 A
Patent Document 2: JP 2003-231715 A
Patent Document 3: WO 2018/124015
Patent Document 4: WO 2018/124014
Patent Document 5: JP 2007-321099 A Non-Patent Document Non-Patent Document 1: Journal of Polymer Science: Part A: Polymer Chemistry, Vol. 35, 3603-3611 (1997)

SUMMARY OF THE INVENTION

Problems to be Solved by the Invention

However, in the methods of producing a modified vinyl alcohol-based polymer described in Patent Documents 3 and 4, transesterification is carried out in a state where the vinyl alcohol-based polymer is dissolved in DMSO. To isolate the modified vinyl alcohol-based polymer, the polymer thus has to be precipitated in a large amount of poor solvent after the transesterification, causing extreme complication and economic disadvantages. In the case of precipitating a polymer by such a method, it is difficult to control the shape of particles and it is also found that use of the polymer thus obtained as a column filler causes problems of poor liquid flow and the like.

The present inventors also find a problem that, having extremely high affinity for vinyl alcohol-based polymers, DMSO is likely to remain in the resin even when precipitated in a poor solvent. In addition, a problem is also found that, having a high ratio of three or more consecutive vinyl ester groups and having relatively low lipophilicity, the modified vinyl alcohol-based polymer obtained by the production method described in Patent Document 3 has insufficient retentivity of organic substances when used as a column filler.

Use water, not DMSO as the solvent for esterification, the methods of producing a modified vinyl alcohol-based polymer described in Patent Document 5 and Non-Patent Document 1 can solve the problem of the residual sulfur content while, to isolate the modified vinyl alcohol-based polymer, the polymer has to be precipitated in a large amount of poor solvent after esterification, causing extreme complication and economic disadvantages. In the case of precipitating a polymer by such a method, it is difficult to control the shape of particles and it is also found that use of the polymer thus obtained as a column filler causes problems of poor liquid flow and the like. Moreover, Patent Document 5 only discloses the solution containing a modified vinyl alcohol-based polymer and does not disclose the particle shape at all.

The present invention has been made to solve the above problems, and it is an object thereof to provide a method of producing modified vinyl alcohol-based polymer particles having an unsaturated hydrocarbon group that is capable of controlling the particle shape and has excellent cost efficiency. It is also an object thereof to provide modified vinyl alcohol-based polymer particles having an unsaturated hydrocarbon group that have high lipophilicity, have a low sulfur content, and have an average particle diameter in a predetermined range.

Means for Solving the Problems

The present inventors have been studied intensively to solve the above problems, and as a result, they have found the following. That is, they have found that reaction of unsaturated carboxylic acid with vinyl alcohol copolymer particles by mixing vinyl alcohol-based polymer particles with a mixed medium containing unsaturated carboxylic acid, an acid catalyst, and water allows not only omitting precipitation in a large amount of poor solvent for isolation of the reaction product but also controlling the particle shape of the modified vinyl alcohol-based polymer to be obtained. They have also found that the ratio and the particle diameter of three or more consecutive vinyl ester groups in modified vinyl alcohol-based polymer particles being kept in specific ranges allow improvement of liquid flowability and lipophilicity when the modified vinyl alcohol-based polymer particles are used as a column filler, and thus have come to complete the present invention.

That is, the above problems are solved by providing a method of producing modified vinyl alcohol-based polymer particles, comprising mixing vinyl alcohol-based polymer particles with a mixed medium containing unsaturated carboxylic acid, an acid catalyst, and water, wherein the unsaturated carboxylic acid is represented by a formula (1) below, and, by mixing the vinyl alcohol-based polymer particles with the mixed medium, the vinyl alcohol-based polymer particles are reacted with the unsaturated carboxylic acid to obtain modified vinyl alcohol-based polymer particles containing a vinyl ester unit represented by a formula (2) below, having a vinyl alcohol unit content based on the total constitutional units of 60 mol % or more and less than 95 mol %, and having an average particle diameter from 50 to 2000 μm,

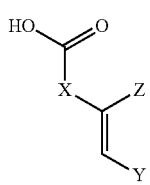
(1)

[in the formula (1), X denotes a carbon-carbon bond or a divalent saturated hydrocarbon group having a carbon number from 1 to 10 optionally having a branched structure, Y denotes a hydrogen atom or a saturated hydrocarbon group having a carbon number from 1 to 6 optionally having a branched structure, and Z denotes a hydrogen atom or a methyl group,]

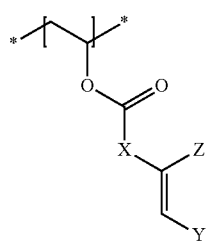
(2)

[in the formula (2), X, Y, and Z denote the same as in the formula (1).]

In this context, it is preferred that the modified vinyl alcohol-based polymer particles have a specific surface area from 0.01 to 1.0 m²/g. It is also preferred that the mixed medium has a water content from 1 to 20 mass %. It is also preferred that the mixed medium further contains acetic acid. It is also preferred that Y denotes a hydrogen atom. It is also preferred that X denotes a carbon-carbon bond.

The production method preferably further comprising washing the modified vinyl alcohol-based polymer particles.

The above problems are also solved by providing modified vinyl alcohol-based polymer particles comprising a vinyl ester unit represented by a formula (2) below, wherein a ratio of three or more consecutive vinyl ester units to the total vinyl ester units is 30% or less, a vinyl alcohol unit content based on the total constitutional units is 60 mol % or more and less than 95 mol %, and an average particle diameter is from 50 to 2000 μm:

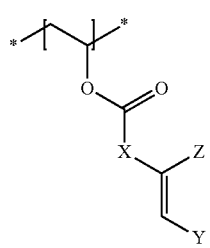
(2)

[in the formula (2), X denotes a carbon-carbon bond or a divalent saturated hydrocarbon group having a carbon number from 1 to 10 optionally having a branched structure, Y denotes a hydrogen atom or a saturated hydrocarbon group having a carbon number from 1 to 6 optionally having a branched structure, and Z denotes a hydrogen atom or a methyl group.]

In this context, it is preferred that a sulfur content in the modified vinyl alcohol-based polymer particles is from 0.01 to 20000 ppm. It is also preferred that a yellow index (YI) of the modified vinyl alcohol-based polymer particles measured in accordance with ASTM D1925 is 50 or less. It is also preferred that a content of the vinyl ester unit represented by the formula (2) based on the total constitutional units in the modified vinyl alcohol-based polymer particles is from 0.01 to 10 mol %. It is also preferred that Y denotes a hydrogen atom. It is also preferred that X denotes a carbon-carbon bond.

Effects of the Invention

The method of producing modified vinyl alcohol-based polymer particles of the present invention does not cause the problem of the residual sulfur content derived from a liquid medium used for reaction and the like and is also capable of modifying the vinyl alcohol-based polymer particles while maintaining the particle shape, and thus the method needs no process for precipitating the polymer in a large amount of poor solvent, thereby being convenient and economically excellent. The modified vinyl alcohol-based polymer particles of the present invention have high lipophilicity, have a low sulfur content, have excellent high-energy beam reactivity, and have an average particle diameter in a predetermined range, and thus are preferably used for a column filler and the like.

Modes for Carrying Out the Invention

The present invention is a method of producing modified vinyl alcohol-based polymer particles, comprising mixing vinyl alcohol-based polymer particles with a mixed medium containing unsaturated carboxylic acid, an acid catalyst, and water, wherein
the unsaturated carboxylic acid is represented by a formula (1) below, and,
by mixing the vinyl alcohol-based polymer particles with the mixed medium, the vinyl alcohol-based polymer particles are reacted with the unsaturated carboxylic acid to obtain modified vinyl alcohol-based polymer particles containing a vinyl ester unit represented by a formula (2) below, having a vinyl alcohol unit content based on the total constitutional units of 60 mol % or more and less than 95 mol %, and having an average particle diameter from 50 to 2000 μm,

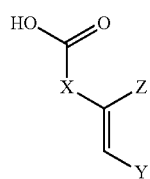
(1)

[in the formula (1), X denotes a carbon-carbon bond or a divalent saturated hydrocarbon group having a carbon number from 1 to 10 optionally having a branched structure, Y denotes a hydrogen atom or a saturated hydrocarbon group having a carbon number from 1 to 6 optionally having a branched structure, and Z denotes a hydrogen atom or a methyl group,]

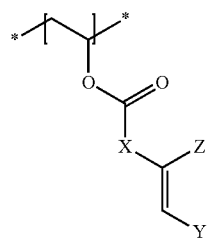
(2)

[in the formula (2), X, Y, and Z denote the same as in the formula (1).]

In the production method of the present invention, as unsaturated carboxylic acid to be reacted with the vinyl alcohol-based polymer particles, one that is represented by the formula (1) is used. X in the formula (1) denotes a carbon-carbon bond or a divalent saturated hydrocarbon group having a carbon number from 1 to 10 optionally having a branched structure. From the perspective of high-energy beam reactivity, it is preferred that X denotes a carbon-carbon bond.

The saturated hydrocarbon group used as X has a carbon number from 1 to 10. The carbon number of more than 10 causes worsening of water solubility. The carbon number is preferably 5 or less, more preferably 3 or less, and even more preferably 2 or less.

Examples of the divalent saturated hydrocarbon group used as X include alkylene groups, cycloalkylene groups, and the like. Examples of the alkylene groups include a methylene group, an ethylene group, a propylene group, a butylene group, a pentylene group, a hexylene group, a heptylene group, an octylene group, a nonylene group, a decylene group, and the like. Examples of the cycloalkylene groups include a cyclopropylene group, a cyclobutylene group, a cyclopentylene group, a cyclohexylene group, and the like. The alkylene groups and the cycloalkylene groups used as X optionally have an alkyl group, such as a methyl group and an ethyl group, as the branched structure.

Y in the formula (1) denotes a hydrogen atom or a saturated hydrocarbon group having a carbon number from 1 to 6 optionally having a branched structure. It is preferred that Y denotes a hydrogen atom.

The saturated hydrocarbon group used as Y has a carbon number from 1 to 6. The carbon number of more than 6 has a risk of causing worsening of water solubility. The carbon number is preferably 5 or less, more preferably 3 or less, and even more preferably 2 or less.

Examples of the saturated hydrocarbon group used as Y include alkyl groups, cycloalkyl groups, and the like. Examples of the alkyl groups include a methyl group, an ethyl group, a propyl group, an isopropyl group, a butyl group, an isobutyl group, a sec-butyl group, a tert-butyl group, a pentyl group, an isopentyl group, a neopentyl group, a hexyl group, and the like. Examples of the cycloalkyl groups include a cyclopropyl group, a cyclobutyl group, a cyclopentyl group, a cyclohexyl group, and the like. The alkyl groups and the cycloalkyl groups used as Y optionally have an alkyl group, such as a methyl group and an ethyl group, as the branched structure.

Specific examples of the unsaturated carboxylic acid represented by the formula (1) include methacrylic acid, acrylic acid, crotonic acid, 3-methyl-3-butenoic acid, 4-pentenoic acid, 2-methyl-4-pentenoic acid, 5-hexenoic acid, 3,3-dimethyl-4-pentenoic acid, 7-octenoic acid, trans-3-pentenoic acid, trans-4-decenoic acid, 10-undecenoic acid, and the like. Among all, from the perspective of industrial availability and reactivity, methacrylic acid, acrylic acid, 4-pentenoic acid, and 10-undecenoic acid are preferred.

In the production method of the present invention, an acid catalyst is used as the catalyst for reaction of vinyl alcohol-based polymer particles with the unsaturated carboxylic acid. This accelerates the reaction of the vinyl alcohol-based polymer particles with the unsaturated carboxylic acid. The acid catalyst may catalyze dehydration esterification of the unsaturated carboxylic acid represented by the formula (1) and the hydroxyl groups in the vinyl alcohol-based polymer particles, and either of organic acid and inorganic acid may be used. Examples of the organic acid include methanesulfonic acid, benzenesulfonic acid, trifluoromethanesulfonic acid, and paratoluenesulfonic acid. Examples of the inorganic acid include sulfuric acid, hydrochloric acid, and nitric acid. Among all, methanesulfonic acid, paratoluenesulfonic acid, and sulfuric acid are preferred, and paratoluenesulfonic acid is particularly preferred.

The vinyl alcohol-based polymer constituting the vinyl alcohol-based polymer particles used in the present invention preferably has a degree of saponification from 60 to 99.9 mol %. The vinyl alcohol-based polymer preferably has a viscosity-average degree of polymerization from 100 to 5000 and more preferably from 200 to 4000. A viscosity-average degree of polymerization of less than 100 has a risk of reducing the mechanical strength of a modified vinyl alcohol-based polymer to be obtained. Meanwhile, a viscosity-average degree of polymerization of more than 5000 has a risk of causing difficulty in industrial production of the vinyl alcohol-based polymer particles. The degree of saponification and the viscosity-average degree of polymerization of the vinyl alcohol-based polymer are measured in accordance with JIS K6726.

The vinyl alcohol units in the vinyl alcohol-based polymer may be derived from vinyl ester units by hydrolysis, alcoholysis, and the like. Accordingly, depending on the conditions for conversion from vinyl ester units to vinyl alcohol units and the like, vinyl ester units sometimes remain in the vinyl alcohol-based polymer.

Examples of vinyl ester of the vinyl ester units include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, vinyl benzoate, and the like. Among them, vinyl acetate is preferred from an industrial perspective.

Without inhibiting the effects of the present invention, the vinyl alcohol-based polymer may contain vinyl alcohol units and monomer units other than the vinyl ester units. Examples of such another monomer unit include those derived from ethylenic unsaturated monomers copolymerizable with vinyl ester. Examples of such an ethylenic unsaturated monomer include: α-olefins, such as ethylene, propylene, n-butene, isobutylene, and 1-hexene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof (e.g., quaternary salts); methacrylamide, N-methylmethacrylamide, N-ethylmethacrylamide, methacrylamidopropanesulfonic acid and salts thereof, methacrylamide propyldimethylamine and salts thereof (e.g., quaternary salts); vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate, 2,3-diacetoxy-1-allyloxypropane, and allyl chloride; unsaturated dicarboxylic acids, such as maleic acid, itaconic acid, and fumaric acid, and salts thereof and esters thereof; vinylsilyl compounds, such as vinyltrimethoxysilane; isopropenyl acetate; and the like.

The contents of the vinyl alcohol units and the monomer units other than the vinyl ester units in the vinyl alcohol-based polymer is usually 10 mol % or less, preferably 5 mol % or less, and more preferably 1 mol % or less.

The vinyl alcohol-based polymer particles used in the present invention preferably has an average particle diameter from 50 to 2000 μm. An average particle diameter of less than 50 μm has a risk of causing insufficient liquid flow when modified vinyl alcohol-based polymer particles thus obtained are used as a column filler. The average particle diameter is more preferably 100 μm or more, even more preferably 200 μm or more, particularly preferably 300 μm or more, and most preferably 500 μm or more. Meanwhile, an average particle diameter of more than 2000 μm, there is a risk that reaction does not uniformly proceed inside and outside the particles. The average particle diameter is more preferably 900 μm or less and even more preferably 800 μm or less.

By mixing the vinyl alcohol-based polymer particles with a mixed medium containing the unsaturated carboxylic acid represented by the formula (1), the acid catalyst, and water, the vinyl alcohol-based polymer particles are reacted with the unsaturated carboxylic acid to obtain modified vinyl alcohol-based polymer particles. The vinyl alcohol-based polymer particles are thus reacted with the unsaturated carboxylic acid, that is, reaction is carried out while maintaining the particle shape of the vinyl alcohol-based polymer particles as a raw material, thereby allowing not only omitting precipitation in a large amount of poor solvent for isolation of the reaction product but also controlling the particle shape of the modified vinyl alcohol-based polymer particles. In addition, there is no problem that a sulfur content derived from a liquid medium used for reaction and the like remains in the modified vinyl alcohol-based polymer particles. Further, in the modified vinyl alcohol-based polymer particles thus obtained, a ratio of three or more consecutive vinyl ester units is reduced and thus lipophilicity of the modified vinyl alcohol-based polymer particles is improved. As a method of reacting the vinyl alcohol-based polymer particles with the unsaturated carboxylic acid, a preferred method comprises: mixing the vinyl alcohol-based polymer particles with the mixed medium; thereby dispersing the vinyl alcohol-based polymer particles in the mixed medium to react the vinyl alcohol-based polymer particles with the unsaturated carboxylic acid. A specific example includes a method comprising: mixing the vinyl alcohol-based polymer particles with the mixed medium to form a slurry or a dispersion; thereby reacting the vinyl alcohol-based polymer particles with the unsaturated carboxylic acid. Other examples include a method comprising: uniformly blending the vinyl alcohol-based polymer particles with the mixed medium; thereby reacting the vinyl alcohol-based polymer particles with the unsaturated carboxylic acid, and the like.

A method of mixing the vinyl alcohol-based polymer particles with the mixed medium is not particularly limited as long as it is capable of uniformly mixing both. Specific examples include (1) a method comprising: preparing the mixed medium; and then mixing the vinyl alcohol-based polymer particles with the mixed medium, (2) a method comprising: mixing the vinyl alcohol-based polymer with some components of the mixed medium; and then mixing a mixture thus obtained with the rest of the components of the mixed medium, (3) a method comprising: simultaneously mixing each component of the mixed medium with the vinyl alcohol-based polymer particles, and the like, and among all, (1) is preferred.

A mass ratio [polymer particles/mixed medium] of the vinyl alcohol-based polymer particles to the mixed medium for mixing the vinyl alcohol-based polymer particles with the mixed medium is preferably from 3/97 to 90/10. A mass ratio [polymer particles/mixed medium] of less than 3/97 has a risk of severely reducing the reactivity. The mass ratio [polymer particles/mixed medium] is preferably 10/90 or more. Meanwhile, a mass ratio [polymer particles/mixed medium] of more than 90/10 has a risk of not allowing uniform mixing of the vinyl alcohol-based polymer particles with the mixed medium and a risk of severely reducing the reactivity. The mass ratio [polymer particles/mixed medium] is more preferably 80/20 or less and even more preferably 50/50 or less.

A water content of the total mixed medium other than the vinyl alcohol-based polymer particles is preferably from 1 to 20 mass %. A water content of less than 0.1 mass % has a risk that the modified vinyl alcohol-based polymer particles to be obtained is likely to be colored. The water content is more preferably 0.3 mass % or more, even more preferably 1 mass % or more, and particularly preferably 2 mass % or more. Meanwhile, a water content of more than 20 mass % has a risk of dissolving the vinyl alcohol-based polymer during reaction, causing difficulty in modification of the vinyl alcohol-based polymer particles while maintaining the particle shape. The water content is more preferably 15 mass % or less and even more preferably 12 mass % or less.

For reaction of the vinyl alcohol-based polymer particles with the unsaturated carboxylic acid, an amount of the acid catalyst to be added is preferably from 0.0001 to 0.1 mol per mol of hydroxyl group in the vinyl alcohol-based polymer. The amount to be added is more preferably 0.0005 mol or more. Meanwhile, the amount to be added is more preferably 0.08 mol or less.

A content of the unsaturated carboxylic acid in the mixed medium is preferably from 5 to 2000 parts by mass based on 100 parts by mass of the vinyl alcohol-based polymer particles. An amount of the unsaturated carboxylic acid to be added of less than 5 parts by mass has a risk of reducing the reactivity. The content of the unsaturated carboxylic acid is more preferably 10 parts by mass or more, even more preferably 20 parts by mass or more, and particularly preferably 30 parts by mass or more. Meanwhile, a content of the unsaturated carboxylic acid of more than 2000 parts by mass has a risk of increasing unreacted unsaturated carboxylic acid and increasing the costs. The content of the unsaturated carboxylic acid is more preferably 1500 parts by mass or less, even more preferably 1000 parts by mass or less, and particularly preferably 700 parts by mass or less.

From the perspective of controlling a content of vinyl acetate units in the modified vinyl alcohol-based polymer, the mixed medium preferably further contains acetic acid. A content of the acetic acid in the mixed medium is preferably from 1 to 1000 parts by mass based on 100 parts by mass of water in the mixed medium. The content of the acetic acid is more preferably 5 parts by mass or more and even more preferably 10 parts by mass or more. Meanwhile, the content of the acetic acid is more preferably 800 parts by mass or less and even more preferably 600 parts by mass or less.

The mixed medium may contain additives other than the unsaturated carboxylic acid represented by the formula (1), the acid catalyst, water, and acetic acid. Examples of such an additive include surfactants and organic solvents. Examples of the surfactant include: nonionic surfactants, such as polyoxyethylene-alkyl ether type, polyoxyethylene-alkyl phenol type, polyoxyethylene-polyhydric alcohol ester type, esters of polyhydric alcohol and fatty acid, and oxyethylene-oxypropylene block polymers; anionic surfactants, such as higher alcohol sulfate, alkali salt of higher fatty acid, polyoxyethylene alkylphenol ether sulfate, alkylbenzene sulfonate, naphthalene sulfonate formalin condensate, alkyl diphenyl ether sulfonate, dialkyl sulfosuccinate, and higher alcohol phosphate salt; and reactive surfactants. Examples of the organic solvent include: alcohols, such as methanol, ethanol, propanol, and butanol; aliphatic or alicyclic hydrocarbons, such as n-hexane, n-pentane, and cyclohexane; aromatic hydrocarbons, such as benzene and toluene; nitriles, such as acetonitrile and benzonitrile; ethers, such as diethyl ether, diphenyl ether, anisole, 1,2-dimethoxyethane, and 1,4-dioxane; ketones, such as acetone, methyl ethyl ketone, methyl isopropyl ketone, and methyl isobutyl ketone; esters, such as methyl acetate, ethyl acetate, and ethyl propionate; and the like. Examples of such another additive also include ultraviolet absorbers, light stabilizers, antioxidants, plasticizers, and defoamers. The content of these other additives in the mixed medium is preferably 50 mass % or less and more preferably 35 mass % or less. The mixed medium preferably does not contain a liquid medium containing sulfur.

A temperature for reacting the vinyl alcohol-based polymer particles with the unsaturated carboxylic acid is preferably from 10° C. to 120° C. The temperature is more preferably 30° C. or more and even more preferably 50° C. or more. Meanwhile, the temperature is more preferably 100° C. or less and even more preferably 90° C. or less. Reaction time for reacting the vinyl alcohol-based polymer particles with the unsaturated carboxylic acid is usually from 0.5 to 72 hours.

It is preferred to further wash the modified vinyl alcohol-based polymer particles after reaction. Examples of the specific washing method include a method comprising washing the particles with a solvent. Specific examples include a method comprising: immersing the particles in a solvent; and then draining, a method comprising circulating a solvent in a washing column while contacting the particles with the solvent for washing, a method comprising flowing the particles while spraying a washing solvent, and the like. Examples of the solvent to be used include: alcohols, such as methanol, ethanol, propanol, and butanol; aliphatic and alicyclic hydrocarbons, such as n-hexane, n-pentane, and cyclohexane; aromatic hydrocarbons, such as benzene and toluene; nitriles, such as acetonitrile and benzonitrile; ethers, such as diethyl ether, diphenyl ether, anisole, 1,2-dimethoxyethane, and 1,4-dioxane; ketones, such as acetone, methyl ethyl ketone, methyl isopropyl ketone, and methyl isobutyl ketone; esters, such as methyl acetate, ethyl acetate, and ethyl propionate; and the like. Among all, alcohols, ethers, ketones, and esters are more preferred, methanol, ethanol, propanol, diethyl ether, 1,2-dimethoxyethane, acetone, methyl ethyl ketone, methyl acetate, and ethyl acetate are even more preferred, and methanol, propanol, acetone, methyl ethyl ketone, methyl acetate, and ethyl acetate are particularly preferred. One type of these organic solvents may be used singly or two or more types of them may be used together.

It is preferred to wash the modified vinyl alcohol-based polymer particles after reaction as needed and then to dry the particles. In this situation, usually, the drying temperature is from 20° C. to 150° C. and the drying time is from 1 to 72 hours. The modified vinyl alcohol-based polymer particles may be dried under atmospheric pressures or under reduced pressures.

The modified vinyl alcohol-based polymer particles thus obtained have to have an average particle diameter from 50 to 2000 µm. The modified vinyl alcohol-based polymer particles having such an average particle diameter are excellent in liquid flowability and the like when used as a column filler. The production method of the present invention facilitates controlling the particle shape of the modified vinyl alcohol-based polymer and thus allows convenient production of the modified vinyl alcohol-based polymer particles having such an average particle diameter. An average particle diameter of less than 50 µm causes insufficient liquid flow when the modified vinyl alcohol-based polymer particles thus obtained are used as a column filler. The average particle diameter is preferably 100 µm or more, more preferably 200 µm or more, even more preferably 300 µm or more, and particularly preferably 500 µm or more. Meanwhile, an average particle diameter of more than 2000 µm causes reaction not to uniformly proceed inside and outside the particles during production of the modified vinyl alcohol-based polymer particles. The average particle diameter is preferably 900 µm or less and more preferably 800 µm or less. It is possible to obtain the average particle diameter of the modified vinyl alcohol-based polymer particles by a method using a laser diffractometer described later in Examples.

It is preferred that the modified vinyl alcohol-based polymer particles obtained have a specific surface area from 0.01 to 1.0 m$^2$/g. A specific surface area of less than 0.01 m$^2$/g has a risk of worsening separation performance. The specific surface area is more preferably 0.1 m$^2$/g or more. Meanwhile, a specific surface area of more than 1.0 m$^2$/g has a risk of causing consolidation of the particles and poor filtration when used as a column filler. It is possible to obtain the specific surface area of the modified vinyl alcohol-based polymer particles by a method described later in Examples.

From the perspective of improving the lipophilicity, the modified vinyl alcohol-based polymer particles thus obtained preferably has a ratio of three or more consecutive vinyl ester units to the total vinyl ester units of 30 mol % or less. The ratio is more preferably 25 mol % or less, even more preferably 20 mol % or less, and particularly preferably 16 mol % or less. Meanwhile, the ratio of three or more consecutive vinyl ester units is usually 1 mol % or more. It is possible to obtain the ratio of three or more consecutive vinyl ester units by a method using $^1$H-NMR measurement described later in Examples.

The modified vinyl alcohol-based polymer thus obtained has to have a vinyl alcohol unit content based on the total constitutional units of 60 mol % or more and less than 95 mol %. A vinyl alcohol unit content of less than 60 mol % has a risk of severely reducing the crystallinity of the modified vinyl alcohol-based polymer and reducing the mechanical strength. The vinyl alcohol unit content is more preferably 70 mol % or more. Meanwhile, a vinyl alcohol unit content of 95 mol % or more has a risk of causing insufficient lipophilicity of the modified vinyl alcohol-based polymer particles to be obtained. It is possible to obtain the vinyl alcohol unit content by a method using $^1$H-NMR measurement described later in Examples.

The modified vinyl alcohol-based polymer particles thus obtained preferably has a content of a vinyl ester unit represented by the formula (2) from 0.01 to 10 mol % based on the total constitutional units. A content of the vinyl ester units of less than 0.01 mol % has a risk that crosslinking reaction does not sufficiently proceed during crosslinking reaction of the modified vinyl alcohol-based polymer particles. The content of the vinyl ester units is more preferably 0.05 mol % or more, even more preferably 0.3 mol % or more, and particularly preferably 0.5 mol % or more. Meanwhile, a content of the vinyl ester units of more than 10 mol % has a risk of causing worsening of water solubility of the modified vinyl alcohol-based polymer particles. The content of the vinyl ester units is more preferably 8 mol % or less and even more preferably 5 mol % or less. It is possible to obtain the content of the vinyl ester unit represented by the formula (2) by a method using $^1$H-NMR measurement described later in Examples.

Without inhibiting the effects of the present invention, the modified vinyl alcohol-based polymer particles thus obtained may contain vinyl alcohol units and monomer units other than the vinyl ester units. Examples of such another monomer unit include those described above as the monomer units other than vinyl alcohol units and vinyl ester units contained in the vinyl alcohol-based polymer particles used for production of the modified vinyl alcohol-based polymer particles. The content of the monomer units other than the vinyl alcohol units and the vinyl ester units in the modified vinyl alcohol-based polymer particles is usually 10 mol % or less, preferably 5 mol % or less, and more preferably 1 mol % or less.

The modified vinyl alcohol-based polymer particles thus obtained preferably has a viscosity-average degree of polymerization from 100 to 5000 and more preferably from 200 to 4000. A viscosity-average degree of polymerization of less than 100 has a risk of reducing the mechanical strength of the modified vinyl alcohol-based polymer particles thus obtained. Meanwhile, a viscosity-average degree of polymerization of more than 5000 has a risk of causing difficulty in industrial production of the vinyl alcohol-based polymer particles. The viscosity-average degree of polymerization of the modified vinyl alcohol-based polymer particles is measured in accordance with JIS K6726.

The sulfur content in the modified vinyl alcohol-based polymer particles thus obtained is preferably from 0.01 to 20000 ppm. The modified vinyl alcohol-based polymer particles having such a low sulfur content is less likely to cause a problem of contamination due to elution of the sulfur content when used as a column filler. The sulfur content is more preferably 10000 ppm or less, even more preferably 5000 ppm or less, and particularly preferably 3000 ppm or less. Meanwhile, a sulfur content of less than 0.01 ppm has a risk of causing difficulty in industrial production of the modified vinyl alcohol-based polymer particles. The sulfur content is more preferably 0.1 ppm or more and even more preferably 1 ppm or more.

The modified vinyl alcohol-based polymer particles thus obtained preferably has a yellow index (YI) measured in accordance with ASTM D1925 of 50 or less. When the modified vinyl alcohol-based polymer particles with a good hue are used as a column filler, it is possible to determine deterioration of a column using a change in hue as an index. The YI is more preferably 40 or less, even more preferably 30 or less, and particularly preferably 20 or less.

Modified vinyl alcohol-based polymer particles of the present invention include a vinyl ester unit represented by a formula (2) below, wherein a ratio of three or more consecutive vinyl ester units to the total vinyl ester units is 30% or less, a vinyl alcohol unit content based on the total constitutional units is 60 mol % or more and less than 95 mol %, and an average particle diameter is from 50 to 2000 µm:

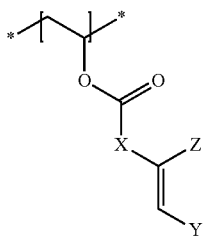

(2)

[in the formula (2), X denotes a carbon-carbon bond or a divalent saturated hydrocarbon group having a carbon number from 1 to 10 optionally having a branched structure, Y denotes a hydrogen atom or a saturated hydrocarbon group having a carbon number from 1 to 6 optionally having a branched structure, and Z denotes a hydrogen atom or a methyl group.]

The vinyl ester unit represented by the formula (2) in the modified vinyl alcohol-based polymer particles of the present invention is the same as the vinyl ester unit represented by the formula (2) in the modified vinyl alcohol-based polymer particles obtained by the production method described above.

It is preferred that a sulfur content in the modified vinyl alcohol-based polymer particles of the present invention is from 1 to 20000 ppm. It is also preferred that a yellow index (YI) of the modified vinyl alcohol-based polymer particles measured in accordance with ASTM D1925 is 50 or less. It is also preferred that a content of the vinyl ester unit represented by the formula (2) based on the total constitutional units in the modified vinyl alcohol-based polymer particles is from 0.01 to 10 mol %.

The above modified vinyl alcohol-based polymer particles have high lipophilicity, a low sulfur content, excellent high-energy beam reactivity, and an average particle diameter in a predetermined range, and thus are preferably used for a wide range of applications, such as a column filler and a shaped article. The modified vinyl alcohol-based polymer particles of the present invention having an average particle diameter in a predetermined range are efficiently transported, and thus cost reduction is expected. Moreover, the modified vinyl alcohol-based polymer particles of the present invention have a low content of fine powder containing sulfur, and thus allow preventing health damage of operators from sucking them.

EXAMPLES

Although the present invention is described in more detail below with reference to Examples, the present invention is not at all limited by Examples below. It should be noted that "%" and "parts" in Examples and Comparative Examples respectively indicate "mass %" and "parts by mass" unless otherwise specified.

Calculation of Vinyl Alcohol Unit Content

Using a nuclear magnetic resonance apparatus "LAMBDA 500" manufactured by JEOL Ltd., $^1$H-NMR of modified vinyl alcohol-based polymer particles was measured at room temperature with a DMSO-d6 solvent, and the vinyl alcohol unit content of the polymer particles was calculated from an integral of a peak (from 3.4 to 4.0 ppm) derived from methine protons bonded to the hydroxyl groups and an integral of a peak (from 4.7 to 5.3 ppm) derived from methine protons of the vinyl ester groups.

Calculation of Degree of Modification

Using a nuclear magnetic resonance apparatus "LAMBDA 500" manufactured by JEOL Ltd., $^1$H-NMR of modified vinyl alcohol-based polymer particles was measured at room temperature with a DMSO-d6 solvent, and a degree of modification of the polymer particles [content (mol %) of the vinyl ester unit represented by the formula (2) based on the total constitutional units] was calculated from an integral of a peak (from 5.0 to 7.5 ppm) derived from olefin protons. For example, in Example 1, the degree of modification was calculated from an integral of the peak derived from olefin protons appearing at 5.6 ppm and 6.0 ppm.

Calculation of Ratio of Three or more Consecutive Vinyl Ester Groups

Using a nuclear magnetic resonance apparatus "LAMBDA 500" manufactured by JEOL Ltd., $^1$H-NMR of modified vinyl alcohol-based polymer particles was measured at 80° C. with a DMSO-d6 solvent. A ratio of the three or more consecutive vinyl ester groups based on the total vinyl ester units was calculated in accordance with a formula below from an integral of (a) from 4.7 to 4.9 ppm (central methine proton in hydroxyl group-vinyl ester group-hydroxyl group), (b) from 4.9 to 5.05 ppm (central methine proton in hydroxyl group-vinyl ester group-vinyl ester group), and (c) from 5.05 to 5.2 ppm (central methine proton in three consecutive vinyl ester groups).

Ratio of Three or more Consecutive Vinyl Ester Groups (%)=$(c)/\{(a)+(b)+(c)\} \times 100$ Measurement of Average Particle Diameter Modified vinyl alcohol-based polymer particles were dispersed in methanol and a volume-average particle diameter (μm) was measured using a laser diffractometer "LA-950V2" manufactured by Horiba, Ltd.

Measurement of Specific Surface Area

Using a specific surface area measurement apparatus "MONOSORB" manufactured by Yuasa Ionics Co., Ltd., a specific surface area (m$^2$/g) of modified vinyl alcohol-based polymer particles was determined by the BET single point method employing nitrogen adsorption.

Measurement of Hue (Yellow Index: YI)

The YI (ASTM D1925) of the modified vinyl alcohol-based polymer particles obtained in any of Examples and Comparative Examples was measured using a spectral colorimeter "CM-8500d" manufactured by Konica Minolta, Inc. (using D65 light source, CM-A120 white calibration plate, CM-A126 petri dish set, regular reflection measurement SCE, measurement diameter φ 30 mm). To a petri dish, 5 g of the sample was added and the petri dish was shaken by lightly tapping on a side not to press the powder to uniformly spread the powder. In this state, measurement was performed 10 times in total (remeasured after shaking the petri dish once in each time) to define an average value of them as the YI of the polymer particles.

Evaluation of Photosensitivity

To an aqueous solution dissolving the modified vinyl alcohol-based polymer particles obtained in any of Examples and Comparative Examples (concentration of 5 mass %), 1 part by mass of 2-hydroxy-4'-(2-hydroxyethoxy)-2-methylpropiophenone as a photoinitiator was added based on 100 parts by mass of the particles and then dissolved to prepare a coating liquid. The coating liquid was cast into a 15 cm×15 cm mold formed by folding the edges of a polyethylene terephthalate film, and the solvent was sufficiently evaporated at room temperature under atmospheric pressure to obtain a film with a thickness of approximately 100 μm. The film was irradiated with ultraviolet rays at an intensity of 10 J/cm² to prepare an evaluation film and then measure a mass (W2). The evaluation film thus obtained was immersed in a boiling water for 1 hour and then taken out of the water. After vacuum drying at 40° C. for 12 hours, a mass (W1) was measured. From the mass (W1) thus obtained and the mass (W2) of the film before immersion, an elution rate under the boiling conditions was calculated in accordance with a formula below, and the elution rate was used as an index of photosensitivity (a lower elution rate indicates higher photosensitivity). It should be noted that, in the case where an evaluation film was dissolved during immersion in water, it was evaluated as "unmeasurable" and indicated with "-" in Table 1.

Elution Rate (mass %)=100×([W2]−[W1])/[W2]

Evaluation of Lipophilicity

In 4.5 parts by mass of 4-acryloylmorpholine as an organic compound, 0.5 parts by mass of the modified vinyl alcohol-based polymer particles obtained in any of Examples and Comparative Examples were immersed at room temperature for 2 days. The particles were, 2 days later, filtered with a PET mesh with an opening diameter of 56 μm and the liquid on the surface was sufficiently absorbed by a paper wipe. From a mass (W3) of the swollen particles after immersion and a mass (W4) of the particles before immersion, a degree of swelling in ACMO was calculated in accordance with a formula below to define the affinity for organic substances, that is, an index of lipophilicity (a higher degree of swelling indicates higher lipophilicity).

Degree of Swelling=W3/W4

A: Degree of Swelling of 1.6 or more
B: Degree of Swelling of 1.3 or more and less than 1.6
C: Degree of Swelling of less than 1.3

Evaluation of Liquid Flow

The modified vinyl alcohol-based polymer particles obtained in any of Examples and Comparative Examples were irradiated with electron beams at 150 kGy to impart water resistance by crosslinking. A chromatographic column (having a glass filter, with an inner diameter of 50 mm and an opening diameter from 40 to 50 μm, and a stopcock) was filled with 100 parts by mass of the modified vinyl alcohol-based polymer particles thus crosslinked. The column was then filled with 130 parts by mass of a mixture of methanol/water=9/1 (mass ratio), and then the stopcock was opened to start filtration. The filtrate was recovered and the point when 90% (i.e., 117 parts by mass) of the added mixture was collected as the filtrate was defined as "completion of filtration" and the liquid flow was evaluated by the time taken from start of filtration to completion of filtration.

A: Filtration Completed in less than 150 seconds
B: Filtration Completed in 150 seconds or more and less than 300 seconds
C: Filtration Completed taking 300 seconds or more Evaluation of Sulfur Content The modified vinyl alcohol-based polymer particles obtained in any of Examples and Comparative Examples were dried at 80° C. for 12 hours and then a sulfur content of the modified vinyl alcohol-based polymer particles was measured using an organic element analyzer 240011 manufactured by PerkinElmer, Inc.

Example 1

Into a reactor provided with a stirrer, a reflux condenser, and an inlet port, 538.7 parts by mass of methacrylic acid, 28.4 parts by mass of ion exchange water, 1.3 parts by mass of p-methoxyphenol, and 9.1 parts by mass of paratoluene- sulfonic acid monohydrate were sequentially charged, and while stirring at room temperature, 100 parts by mass of a commercially available polyvinyl alcohol resin (viscosity-average degree of polymerization of 500, degree of saponification of 82 mol %, and average particle diameter of 710 μm) was added and heated, while stirring, to 75° C. and reacted in the state of a slurry for 3 hours. Then, the mixture was cooled to room temperature and the contents were filtrated to recover modified polyvinyl alcohol particles. The particles were washed with a large amount of methanol and then dried at 40° C. and 1.3 Pa for 12 hours to obtain target particles. The structural analysis results and the physical property evaluation results of the modified vinyl alcohol-based polymer particles thus obtained are shown in Table 1.

Example 2

Into a reactor provided with a stirrer, a reflux condenser, and an inlet port, 527.3 parts by mass of methacrylic acid, 39.7 parts by mass of ion exchange water, 1.3 parts by mass of p-methoxyphenol, and 7.5 parts by mass of 47% sulfuric acid were sequentially charged, and while stirring at room temperature, 100 parts by mass of a commercially available polyvinyl alcohol resin (viscosity-average degree of polymerization of 1700, degree of saponification of 88 mol %, and average particle diameter of 750 μm) was added and heated, while stirring, to 70° C. and reacted in the state of a slurry for 2 hours. Then, posttreatment was performed in the same manner as in Example 1 to obtain target particles. The structural analysis results and the physical property evaluation results of the modified vinyl alcohol-based polymer particles thus obtained are shown in Table 1.

Example 3

Into a reactor provided with a stirrer, a reflux condenser, and an inlet port, 476.3 parts by mass of methacrylic acid, 62.4 parts by mass of acetic acid, 28.4 parts by mass of ion exchange water, 1.3 parts by mass of p-methoxyphenol, and 9.1 parts by mass of paratoluenesulfonic acid monohydrate were sequentially charged, and while stirring at room temperature, 100 parts by mass of a commercially available polyvinyl alcohol resin (viscosity-average degree of polymerization of 500, degree of saponification of 82 mol %, and average particle diameter of 710 μm) was added and heated, while stirring, to 65° C. and reacted in the state of a slurry for 5 hours. Then, posttreatment was performed in the same manner as in Example 1 to obtain target particles. The structural analysis results and the physical property evaluation results of the modified vinyl alcohol-based polymer particles thus obtained are shown in Table 1.

Example 4

Into a reactor provided with a stirrer, a reflux condenser, and an inlet port, 464.9 parts by mass of methacrylic acid, 85.1 parts by mass of acetic acid, 17.0 parts by mass of ion exchange water, 1.3 parts by mass of p-methoxyphenol, and 3.9 parts by mass of paratoluenesulfonic acid monohydrate were sequentially charged, and while stirring at room temperature, 100 parts by mass of a commercially available polyvinyl alcohol resin (viscosity-average degree of polymerization of 500, degree of saponification of 74 mol %, and average particle diameter of 696 μm) was added and heated, while stirring, to 60° C. and reacted in the state of a slurry for 8 hours. Then, posttreatment was performed in the same manner as in Example 1 to obtain target particles. The structural analysis results and the physical property evaluation results of the modified vinyl alcohol-based polymer particles thus obtained are shown in Table 1.

Example 5

Into a reactor provided with a stirrer, a reflux condenser, and an inlet port, 476.3 parts by mass of 4-pentenoic acid, 62.4 parts by mass of acetic acid, 28.4 parts by mass of ion exchange water, 1.3 parts by mass of p-methoxyphenol, and 9.1 parts by mass of paratoluenesulfonic acid monohydrate were sequentially charged, and while stirring at room temperature, 100 parts by mass of a commercially available polyvinyl alcohol resin (viscosity-average degree of polymerization of 500, degree of saponification of 82 mol %, and average particle diameter of 710 μm) was added and heated, while stirring, to 65° C. and reacted in the state of a slurry for 2 hours. Then, posttreatment was performed in the same manner as in Example 1 to obtain target particles. The structural analysis results and the physical property evaluation results of the modified vinyl alcohol-based polymer particles thus obtained are shown in Table 1.

It should be noted that, as a result of $^1$H-NMR measurement of the modified vinyl alcohol-based polymer particles thus obtained, the olefin proton peak derived from the unsaturated hydrocarbon group and the methine proton peak of the vinyl ester group were overlapped, and thus it was not possible to calculate the ratio of the three or more consecutive vinyl ester groups. Then, the modified vinyl alcohol-based polymer particles were dissolved (modified vinyl alcohol-based polymer particle content of 5 wt %) in water, and then 1 mol of propanethiol was added per mol of the olefin, and 1 mol of 2-hydroxy-4'-(2-hydroxyethoxy)-2-methylpropiophenone was further added as a photoinitiator per mol of propanethiol. The solution thus prepared was irradiated with ultraviolet rays at an intensity of 3000 mJ/cm$^2$. The solution thus obtained was added to a large amount of methanol to precipitate polymer particles, and then the particles were analyzed by $^1$H-NMR and this time it was possible to calculate the ratio of the three or more consecutive vinyl ester groups because the olefin proton peak was disappeared due to the addition of thiol.

Example 6

Into a reactor provided with a stirrer, a reflux condenser, and an inlet port, 499.0 parts by mass of acrylic acid, 39.7 parts by mass of acetic acid, 28.4 parts by mass of ion exchange water, 1.3 parts by mass of p-methoxyphenol, and 3.4 parts by mass of paratoluenesulfonic acid monohydrate were sequentially charged, and while stirring at room temperature, 100 parts by mass of a commercially available polyvinyl alcohol resin (viscosity-average degree of polymerization of 500, degree of saponification of 88 mol %, and average particle diameter of 680 μm) was added and heated, while stirring, to 60° C. and reacted in the state of a slurry for 7 hours. Then, posttreatment was performed in the same manner as in Example 1 to obtain target particles. The structural analysis results and the physical property evaluation results of the modified vinyl alcohol-based polymer particles thus obtained are shown in Table 1.

Example 7

Into a reactor provided with a stirrer, a reflux condenser, and an inlet port, 476.3 parts by mass of methacrylic acid, 51.0 parts by mass of acetic acid, 39.7 parts by mass of ion exchange water, 1.3 parts by mass of p-methoxyphenol, and 4.2 parts by mass of paratoluenesulfonic acid monohydrate were sequentially charged, and while stirring at room temperature, 100 parts by mass of a commercially available polyvinyl alcohol resin (viscosity-average degree of polymerization of 1700, degree of saponification of 99.5 mol %, and average particle diameter of 128 μm) was added and heated, while stirring, to 80° C. and reacted in the state of a slurry for 5 hours. Then, posttreatment was performed in the same manner as in Example 1 to obtain target particles. The structural analysis results and the physical property evaluation results of the modified vinyl alcohol-based polymer particles thus obtained are shown in Table 1.

Example 8

Into a reactor provided with a stirrer, a reflux condenser, and an inlet port, 100 parts by mass of a commercially available polyvinyl alcohol resin (viscosity-average degree of polymerization of 500, degree of saponification of 82 mol %, and average particle diameter of 710 μm) was charged, and while stirring at room temperature, a mixture of 56.0 parts by mass of methacrylic acid, 7.3 parts by mass of acetic acid, 3.3 parts by mass of ion exchange water, 0.3 parts by mass of p-methoxyphenol, and 9.1 parts by mass of paratoluenesulfonic acid monohydrate, mixed in advance, was added in small portions. The mixture was sufficiently stirred and uniformly blended into the entire polyvinyl alcohol resin and then heated, while stirring, to 65° C. and reacted in the state of powder for 5 hours. Then, the powder was washed with a large amount of methanol and then dried at 40° C. and 1.3 Pa for 12 hours to obtain target particles. The structural analysis results and the physical property evaluation results of the modified vinyl alcohol-based polymer particles thus obtained are shown in Table 1.

Example 9

Into a reactor provided with a stirrer, a reflux condenser, and an inlet port, 564.2 parts by mass of methacrylic acid, 2.8 parts by mass of ion exchange water, 1.3 parts by mass of p-methoxyphenol, and 2.6 parts by mass of paratoluenesulfonic acid monohydrate were sequentially charged, and while stirring at room temperature, 100 parts by mass of a commercially available polyvinyl alcohol resin (viscosity-average degree of polymerization of 500, degree of saponification of 74 mol %, and average particle diameter of 696 μm) was added and heated, while stirring, to 75° C. and reacted in the state of a slurry for 4 hours. Then, posttreatment was performed in the same manner as in Example 1 to obtain target particles. The structural analysis results and the physical property evaluation results of the modified vinyl alcohol-based polymer particles thus obtained are shown in Table 1.

Comparative Example 1

A commercially available polyvinyl alcohol resin (viscosity-average degree of polymerization of 500, degree of saponification of 82 mol %, and average particle diameter of 710 μm) was evaluated. The structural analysis results and the physical property evaluation results are shown in Table 1.

Comparative Example 2

Into a reactor provided with a stirrer, a reflux condenser, and an inlet port, 400.0 parts by mass of dimethyl sulfoxide, and 100 parts by mass of a commercially available polyvinyl alcohol resin (viscosity-average degree of polymerization of 500, degree of saponification of 88 mol %, and average particle diameter of 680 μm) vacuum dried at 80° C. for 24 hours in advance were added and heated, while stirring, to 100° C. to obtain a homogeneous solution. To the solution, 66.7 parts by mass of methyl methacrylate and 1.1 parts by mass of phenothiazine were added and stirred until homogeneity. To the solution thus obtained, 1.9 parts by mass of sodium acetate was added as a transesterification catalyst and reacted for 5 hours and then left for cooling at room temperature. DMSO was added to the reaction solution for dilution, and then dropped into methanol to isolate the polymer and dried at 40° C. and 1.3 Pa for 12 hours. The structural analysis results and the physical property evaluation results of the modified vinyl alcohol-based polymer particles thus obtained are shown in Table 1.

Comparative Example 3

Into a reactor provided with a stirrer, a reflux condenser, and an inlet port, 400.0 parts by mass of dimethyl sulfoxide, and 100 parts by mass of a commercially available polyvinyl alcohol resin (viscosity-average degree of polymerization of 500, degree of saponification of 82 mol %, and average particle diameter of 710 μm) vacuum dried at 80° C. for 24 hours in advance were added and heated, while stirring, to 100° C. to obtain a homogeneous solution. To the solution, 64.4 parts by mass of 3,3-methyl dimethylpentenoate was added and stirred until homogeneity. To the solution thus obtained, 0.4 parts by mass of tetramethylammonium methyl carbonate was added as a transesterification catalyst and reacted for 5 hours and then left for cooling at room temperature. DMSO was added to the reaction solution for dilution, and then dropped into methanol to isolate the polymer and dried at 40° C. and 1.3 Pa for 12 hours. The structural analysis results and the physical property evaluation results of the modified vinyl alcohol-based polymer particles thus obtained are shown in Table 1.

Comparative Example 4

Into a reactor provided with a stirrer, a reflux condenser, and an inlet port, 288.0 parts by mass of ion exchange water was charged, and 100 parts by mass of a commercially available polyvinyl alcohol resin (viscosity-average degree of polymerization of 500, degree of saponification of 98 mol %, and average particle diameter of 723 μm) was added while stirring, heated to 95° C., and heated and stirred for 3 hours to obtain a homogeneous solution. The solution was cooled to room temperature, and 329.2 parts by mass of methacrylic acid, 228.8 parts by mass of acetic acid, 2 parts by mass of p-methoxyphenol, and 27.0 parts by mass of a 36% aqueous hydrochloric acid solution were sequentially charged while stirring, heated to 80° C. while stirring, and reacted in the state of a homogeneous solution for 2 hours, and then cooled to room temperature. The solution thus obtained was diluted and added in small portions to a large amount of strongly stirred methanol to precipitate microparticles of the modified vinyl alcohol-based polymer. The precipitate was recovered and further washed with a large amount of methanol, and then dried at 40° C. and 1.3 Pa for 12 hours to obtain target microparticles. The structural analysis results and the physical property evaluation results of the modified vinyl alcohol-based polymer particles thus obtained are shown in Table 1.

TABLE 1

| Unit | Vinyl Alcohol-Based Polymer Particle (Base Polymer) | | | Medium (Substrate) | Water Content [1] mass % | Catalyst | | Reaction Temperature ° C. | Reaction Time h |
|---|---|---|---|---|---|---|---|---|---|
| | Degree of Polymerization — | Degree of Saponification mol % | Average Particle Diameter μm | | | Type — | Amount [2] mol | | |
| Example 1 | 500 | 82 | 710 | Methacrylic Acid | 5 | p-TsOH•$H_2O$ | 0.03 | 75 | 3 |
| Example 2 | 1700 | 88 | 750 | Methacrylic Acid | 7 | 47% $H_2SO_4$ | 0.02 | 70 | 2 |
| Example 3 | 500 | 82 | 710 | Methacrylic Acid/ Acetic Acid | 5 | p-TsOH•$H_2O$ | 0.03 | 85 | 5 |
| Example 4 | 500 | 74 | 898 | Methacrylic Acid/ Acetic Acid | 3 | p-TsOH•$H_2O$ | 0.015 | 80 | 8 |
| Example 5 | 500 | 82 | 710 | 4-Pentenoic Acid/ Acetic Acid | 5 | p-TsOH•$H_2O$ | 0.03 | 65 | 2 |
| Example 6 | 500 | 88 | 680 | Acrylic Acid/ Acetic Acid | 5 | p-TsOH•$H_2O$ | 0.01 | 60 | 7 |
| Example 7 | 1700 | 99.5 | 128 | Methacrylic Acid/ Acetic Acid | 7 | p-TsOH•$H_2O$ | 0.01 | 80 | 5 |
| Example 8 | 500 | 82 | 710 | Methacrylic Acid/ Acetic Acid | 5 | p-TsOH•$H_2O$ | 0.03 | 65 | 5 |
| Example 9 | 500 | 74 | 896 | Methacrylic Acid | 0.5 | p-TsOH•$H_2O$ | 0.01 | 75 | 4 |
| Comparative Example 1 | 500 | 52 | 710 | — | — | — | — | — | — |
| Comparative Example 2 | 500 | 88 | 680 | Methyl Methacrylate/ DMSO | 0.2 | AcONa | 0.01 | 100 | 5 |

TABLE 1-continued

| | | | | | | | | | | |
|---|---|---|---|---|---|---|---|---|---|---|
| Comparative Example 3 | 500 | 82 | 710 | Mpm/Dmao | 0.2 | [Me$_4$N][MeOCOO] | 0.001 | 100 | 5 | |
| Comparative Example 4 | 500 | 98 | 723 | Methacrylic Acid/ Acetic Acid | 35 | 38% HCl aq. | 0.1 | 80 | 2 | |

| | Structure of Modified Vinyl Alcohol-Based Polymer Particle | | | | | Physical Properties of Modified Vinyl Alcohol-Based Polymer | | | | |
|---|---|---|---|---|---|---|---|---|---|---|
| Unit | Vinyl Alcohol Degree of Modification mol % | Ratio of Three or More Consecutive Unit Content mol % | Vinyl Ester Groups % | Average Particle Diameter μm | Specific Surface Area m$^2$/g | Photosensitivity (Elution Rate) mass % | Lipophilicity | Liquid Flow | Yi | Sulfur Content ppm |
| Example 1 | 3.9 | 94.0 | 10.5 | 671 | 0.29 | 8.7 | B | A | 12.0 | 1200 |
| Example 2 | 0.8 | 93.0 | 14.8 | 722 | 0.3 | 5.2 | B | A | 18.5 | 510 |
| Example 3 | 1.4 | 81.8 | 13.5 | 885 | 0.29 | 13.5 | A | A | 11.5 | 980 |
| Example 4 | 0.9 | 73.1 | 24.0 | 655 | 0.32 | 17.4 | A | B | 25.0 | 2400 |
| Example 5 | 2.8 | 79.2 | 16.7 | 680 | 0.31 | 36.8 | A | A | 11.5 | 1030 |
| Example 6 | 1.0 | 88.0 | 15.1 | 710 | 0.31 | 4.8 | A | A | 12.0 | 450 |
| Example 7 | 1.2 | 91.0 | 8.5 | 125 | 1.4 | 5.0 | A | B | 12.5 | 430 |
| Example 8 | 1.5 | 81.5 | 13.3 | 692 | 0.29 | 12.7 | A | A | 11.3 | 780 |
| Example 9 | 0.9 | 76.0 | 16.3 | 685 | 0.31 | 18.6 | A | B | 68.0 | 2300 |
| Comparative Example 1 | 0.0 | 82.0 | 51.2 | 710 | 0.32 | — | C | A | 9.0 | 20 |
| Comparative Example 2 | 2.8 | 79.2 | 39.1 | 35 | 0.38 | 8.5 | C | C | 26.3 | 28500 |
| Comparative Example 3 | 2.5 | 85.0 | 13.3 | 43 | 0.44 | 40.2 | A | C | 68.0 | 43000 |
| Comparative Example 4 | 2.2 | 81.0 | 9.8 | 23 | 0.44 | 13.3 | A | C | 11.2 | 18 |

[1] Water Content in Mixed Medium
[2] Amount of Catalyst added per mol of Hydroxyl Group in Vinyl Alcohol-Based Polymer As clearly seen from Examples 1 through 9, the production method of the present invention allows modification without changing the particle shape, and thus allows convenient isolation of the modified vinyl alcohol-based polymer particles without operation of precipitating the reaction product in a poor solvent. The modified vinyl alcohol-based polymer particles of the present invention had excellent high-energy beam reactivity, and had excellent liquid flow, lipophilicity, and hue when used as a column filler after crosslinking. Since the production method of the present invention did not use DMSO, it was also possible to suppress contamination of the sulfur content.

When vinyl alcohol-based polymer particles were reacted by dissolving in a solvent as in Comparative Examples 2 through 4, modified vinyl alcohol-based polymer particles as a reaction product had to be precipitated in a poor solvent for isolation, and thus the operation was complicated and the particle shape was not readily controlled. The unmodified vinyl alcohol-based polymer particles in Comparative Example 1 did not exhibit photosensitivity. The vinyl alcohol-based polymer particles having the ratio of the three or more consecutive vinyl ester groups of more than 30% in Comparative Examples 1 and 2 had low lipophilicity. As in Comparative Examples 2 through 4, the modified vinyl alcohol-based polymer particles obtained by reacting while the vinyl alcohol-based polymer particles were dissolved had an average particle diameter of less than 50 μm and had poor liquid flow. As in Comparative Examples 2 and 3, use of DMSO caused an extremely large content of sulfur in the modified vinyl alcohol-based polymer particles.

Example 10

The modified vinyl alcohol-based polymer particles obtained in Example 1 was subjected to evaluation as a column filler. The particles were irradiated with electron beams at 150 kGy for impartation of water resistance by crosslinking. A chromatographic column (having a glass filter with an inner diameter of 50 mm and an opening diameter from 40 to 50 μm and a stopcock) was filled with 100 parts by mass of the modified vinyl alcohol-based polymer particles thus crosslinked and 1000 parts by mass of a methanol/water=9/1 (mass ratio) solution was flown as an eluate to wet the polymer particles. By the polymer particles in an upper area of the column, a methanol/water=9/1 (mass ratio) solution containing 10 mass % of ACMO was adsorbed, and then 100 parts by mass of a methanol/water=9/1 (mass ratio) solution was flown as an eluate. The liquid was recovered from a column outlet for analysis.

During the above test, good liquid flow was maintained. The recovered liquid was analyzed by $^1$H-NMR and no ACMO was contained in the recovered liquid, and thus it was confirmed that ACMO was retained in the modified vinyl alcohol-based polymer particles. The recovered liquid was subjected to elementary analysis and found that the sulfur content in the recovered liquid was 10 ppm.

The invention claimed is:

1. A method for producing modified vinyl alcohol-based polymer particles, the method comprising:
mixing vinyl alcohol-based polymer particles with a mixed medium comprising an unsaturated carboxylic acid, an acid catalyst, and water, wherein by mixing the vinyl alcohol-based polymer particles with the mixed medium, the vinyl alcohol-based polymer particles are reacted with the unsaturated carboxylic acid to obtain modified vinyl alcohol-based polymer particles comprising a vinyl ester unit, having a vinyl alcohol unit content based on a total constitutional units of 60 mol % or more and less than 95 mol %, and having an average particle diameter from 50 to 2000 μm,
wherein the unsaturated carboxylic acid is a compound of formula (1):

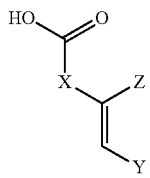

(1)

wherein X denotes a carbon-carbon bond or a divalent saturated hydrocarbon group having a carbon number from 1 to 10 optionally having a branched structure, Y denotes a hydrogen atom or a saturated hydrocarbon group having a carbon number from 1 to 6 optionally having a branched structure, and Z denotes a hydrogen atom or a methyl group, and
the vinyl ester unit is a unit of formula (2):

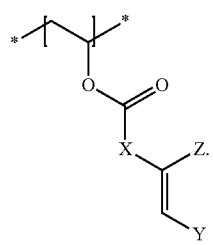

(2)

2. The method of claim 1, wherein the modified vinyl alcohol-based polymer particles have a specific surface area from 0.01 to 1.0 m²/g.

3. The method of claim 1, wherein the mixed medium has a water content from 1 to 20 mass %.

4. The method of claim 1, wherein the mixed medium further comprises acetic acid.

5. The method of claim 1, wherein Y denotes a hydrogen atom.

6. The method of claim 1, wherein X denotes a carbon-carbon bond.

7. The method of claim 1, further comprising washing the modified vinyl alcohol-based polymer particles.

8. Modified vinyl alcohol-based polymer particles, comprising:
a vinyl ester unit, wherein a ratio of three or more consecutive vinyl ester units to a total vinyl ester units is 30% or less, a vinyl alcohol unit content based on a total constitutional units is 60 mol % or more and less than 95 mol %, and an average particle diameter is from 50 to 2000 μm, and
the vinyl ester unit is a unit of formula (2):

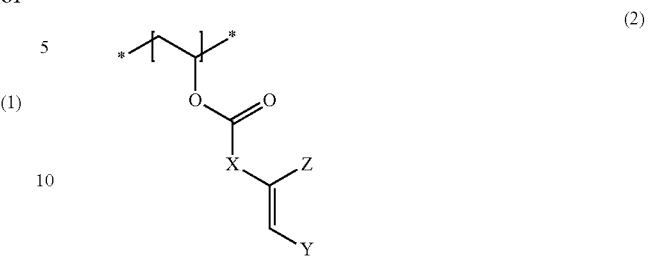

(2)

wherein X denotes a carbon-carbon bond or a divalent saturated hydrocarbon group having a carbon number from 1 to 10 optionally having a branched structure, Y denotes a hydrogen atom or a saturated hydrocarbon group having a carbon number from 1 to 6 optionally having a branched structure, and Z denotes a hydrogen atom or a methyl group, and
wherein a sulfur content is in a range of from 0.01 to 20000 ppm.

9. The modified vinyl alcohol-based polymer particles of claim 8, wherein a sulfur content is in a range of from 0.01 to 10000 ppm.

10. The modified vinyl alcohol-based polymer particles of claim 8, wherein a yellow index (YI) measured in accordance with ASTM D1925 is 50 or less.

11. The modified vinyl alcohol-based polymer particles of claim 8, wherein a content of the vinyl ester unit based on the total constitutional units is from 0.01 to 10 mol %.

12. The modified vinyl alcohol-based polymer particles of claim 8, wherein Y denotes a hydrogen atom.

13. The modified vinyl alcohol-based polymer particles of claim 8, wherein X denotes a carbon-carbon bond.

14. The modified vinyl alcohol-based polymer particles of claim 8, wherein a sulfur content is in a range of from 0.1 to 20000 ppm.

15. The modified vinyl alcohol-based polymer particles of claim 8, wherein a sulfur content is in a range of from 0.1 to 10000 ppm.

16. The modified vinyl alcohol-based polymer particles of claim 8, wherein a sulfur content is in a range of from 0.01 to 5000 ppm.

17. The modified vinyl alcohol-based polymer particles of claim 8, wherein a sulfur content is in a range of from 0.1 to 5000 ppm.

18. The modified vinyl alcohol-based polymer particles of claim 8, wherein a sulfur content is in a range of from 0.01 to 3000 ppm.

19. The modified vinyl alcohol-based polymer particles of claim 8, wherein a sulfur content is in a range of from 0.1 to 3000 ppm.

20. The modified vinyl alcohol-based polymer particles of claim 8, wherein a sulfur content is in a range of from 1 to 3000 ppm.

* * * * *